United States Patent [19]
Cummins

[11] Patent Number: 5,737,606
[45] Date of Patent: Apr. 7, 1998

[54] METHOD AND SYSTEM FOR DELEGATION IN A CLASS-BASED LANGUAGE

[75] Inventor: Fred A. Cummins, Farmington Hills, Mich.

[73] Assignee: Electronic Data Systems Corporation, Plano, Tex.

[21] Appl. No.: 683,289

[22] Filed: Jul. 18, 1996

[51] Int. Cl.⁶ .................................................. G06F 9/40
[52] U.S. Cl. ............................................................ 395/683
[58] Field of Search ................................ 395/683, 701, 395/702, 705, 706, 703

[56] References Cited

U.S. PATENT DOCUMENTS

| | | | |
|---|---|---|---|
| 5,187,786 | 2/1993 | Densmore et al. | 395/600 |
| 5,421,016 | 5/1995 | Conner et al. | 395/700 |
| 5,437,025 | 7/1995 | Bale et al. | 395/600 |
| 5,522,071 | 5/1996 | Guillen et al. | 395/650 |
| 5,600,838 | 2/1997 | Guillen et al. | 395/683 |

OTHER PUBLICATIONS

A. Goldberg and D. Robson, Smalltalk–80 The Language, Addison–Wesley Publishing Comp., pp. 61–66, 00/00/89.

M. Wolczko, "Encapsulation, delegation and inheritance in object–oriented language", Software Engineering Journal, vol. 7, No. 2, pp.95–101, 00/03/92.

N. Yialelis and M. Sloman, "A Security Framework Supporting Domain–Based Acces Control in Distributed Systems", Network and Distributed System Security, 1996 Symposium, pp.26–39, 00/00/96.

M. Aksit and J. Dijskta, "Atomit Delegation: Object–Oriented Transactions", IEEE Software, vol. 8, No. 2, pp 84–92., 00/03/91.

M. Gasser, E. McDermott, "An Architecture for Practical Delegation in a Distributed System", Security and Privacy, 1990 IEEE Symposium, pp.20–30, 00/00/90.

*Primary Examiner*—Alvin E. Oberley
*Assistant Examiner*—Sue Lao
*Attorney, Agent, or Firm*—L. Joy Griebenow; David G. Wille

[57] ABSTRACT

The invention comprises a method and system for achieving delegation in a class-based object oriented language. In accordance with the method of the invention, a message is received with a first object, the message including a first target parameter. The first object then generates a "self" message in response to the first message and sends the "self" message to the object identified by the first target parameter.

16 Claims, 2 Drawing Sheets

METHOD AND SYSTEM FOR DELEGATION IN A CLASS-BASED LANGUAGE

TECHNICAL FIELD OF THE INVENTION

This invention relates generally to object-oriented programing and more particularly to a method and system for delegating messages in a class-based language.

BACKGROUND OF THE INVENTION

Object oriented programming is rapidly becoming the software industry's preferred method for developing software. Essentially, object orientation is a method of implementing software as components of a system and of constructing systems from these components.

"Objects" are software entities comprising data structures and associated operations. Objects can model concrete things or abstract ideas, either in terms of characteristics or in terms of behavior. A software "object" is a group of elements working together or in succession to perform specific tasks. These elements are data elements, also called instance variables, and functions, also called methods, of the object. Objects are defined by creating "classes", which act as templates that instruct a computer how to construct an actual object. For example, a class may specify the number and type of instance variables and the steps involved in methods that define the actions of the object. An object created from a certain class is called an "instance" of that class. The class defines the operations and information initially in an instance, while the current state of the instance is defined by operations subsequently performed on its instance variables by its methods.

A basic feature of object oriented programming is encapsulation of objects. "Encapsulation" means that objects hide (encapsulate) their internal structure and the algorithms that implement their actions. Instead of exposing these implementation details, objects present interfaces that represent their abstractions cleanly with no extraneous implementation information.

Because objects are encapsulated, interactions between objects occur by sending messages that invoke methods. Each object has a protocol, that is, it has a set of messages to which the object can respond. The messages are used to invoke the methods defined for the object. Typical messages are from one object to another object or from an object to itself, but an external source such as a user interface might also send messages to, or receive messages from an object.

In properly encapsulated objects, instance variables are only accessed by methods specified for access to each instance variable. These methods are called accessor methods. Thus, an instance variable is only accessed directly by its get and put accessor methods.

Delegation refers to the process by which a target object incorporates some or all of the data and functionality of a related object. This concept has been used extensively in frame-based languages. In frame-based languages, new objects are typically defined as incorporating the data and functionality of one or more existing objects through delegation. Such objects may then define specific data and functionality that adds to or overrides the incorporated data and functionality. When a message is sent to an object, if the object cannot respond directly, the message is forwarded to a delegation object, sometimes called a parent object. If the delegation invokes a method which directs a message to the "self" object (the object for which processing is currently being performed), these languages will direct the message to the original target object—the delegation object never becomes the target object but only contributes the needed data or functionality.

Class-based object-oriented languages do not currently support delegation. A somewhat similar result can be achieved by explicitly forwarding particular messages to a delegation object or forwarding any message which cannot be handled by the target object to a delegation object through the exception handling message of the particular language. This method, however, does not achieve the same result as described above. If the method invoked through delegation sends a message to "self", the message will be directed to the delegation object, not to the original target object. Consequently, methods on the target object which should override methods on the delegation object will not be invoked, and instance variables on the target object will likewise not be used.

SUMMARY OF THE INVENTION

Thus, a need has arisen to achieve true delegation in a class-based object-oriented language. The present invention comprises a method and system for delegation in a class-based language. In accordance with the method of the invention, a message received by a first object includes a first target parameter. A self message that is sent from the first object in response to the message received by the first object is sent to the object identified by the first target parameter.

The invention has several important technical advantages. Delegation is an important capability for modeling certain kinds of problems and providing application flexibility. The invention allows the use of delegation in class-based languages, thus allowing programmers to use delegation while obtaining other benefits of a class-based object-oriented language. As will be further described below, the invention can be effectively used for adaptive objects and for objects employing roles and views. The invention may also allow software vendors to provide specializable objects for sale without revealing the underlying code of the object. Rather, a vendor need only provide information regarding the messages that the object responds to. Specialized objects can incorporate the purchased capabilities through delegation. Self messages will be properly delegated using the present invention.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
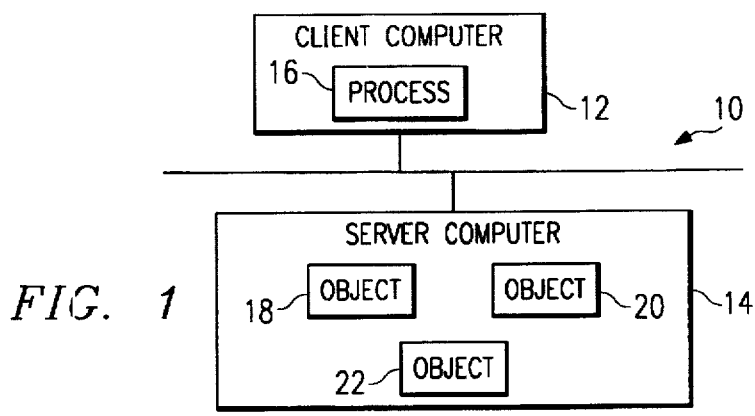
FIG. 1 illustrates a computer network utilizing the present invention.

FIG. 1 illustrates a computer network 10 that will be used to illustrate the operation of the invention. Although the invention is shown in operation in a client server environment, the invention can be used in any environment employing a class-based object oriented language for one or more applications. It may also be used as a mechanism for integration of objects written in different languages on the same or different computers communicating messages through suitable integration software. Computer network 10 comprises one or more client computers 12 connected through a computer network to one or more server computers 14.

In this example, client computer 12 is running an example process 16 that may access object 18, object 20, and/or object 22 on server computer 14. Object 18, object 20, and object 22 may also access each of the other objects on server computer 14. The interaction of process 16 and objects 18, 20 and 22 will be used to illustrate the operation of the invention as described below. It should be understood that objects may be on the same or different computers and may be implemented in the same or different languages. Messages need not originate from a process on another computer. Instead, all messages could be on a single computer. FIG. 1 is only one example of the type of environment in which the invention can be used.

Figure 2:
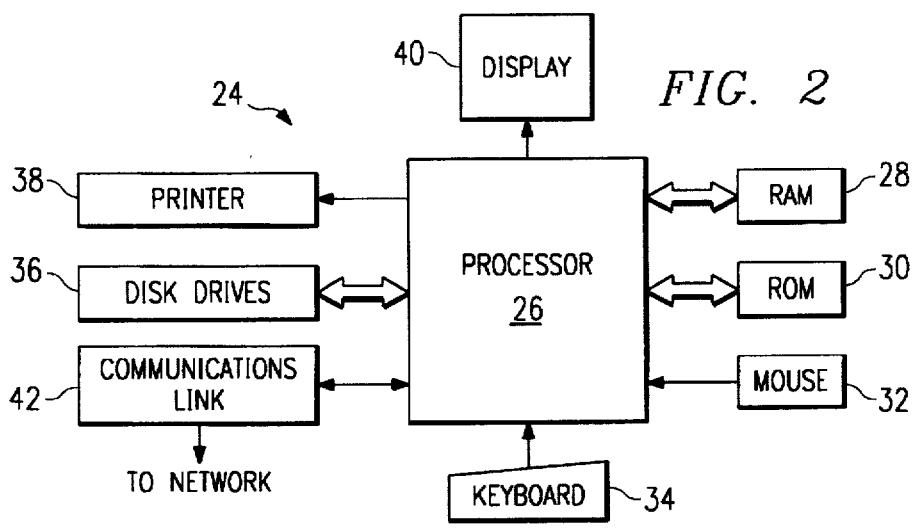
FIG. 2 illustrates a general purpose computer that may be used to implement the present invention.

FIG. 2 illustrates a general purpose computer 24 that may be used for either client computer 12 and/or server computer 14 of FIG. 1. General purpose computer 24 may be used to execute applications that were written using a class-based language employing delegation. General purpose computer 24 may be adapted to execute any of the well known MSDOS, PCDOS, OS2, UNIX, MAC-OS, and WINDOWS operating systems or other operating systems. General purpose computer 24 comprises processor 26, random access memory (RAM) 28, read-only memory (ROM) 30, mouse 32, keyboard 34 and input/output devices, such as printer 38, disk drives 36, display 40, and communications link 42. The present invention includes programs that may be stored in RAM 28, ROM 30, or disk drives 36 and may be executed by processor 26. Communications link 42 is connected to computer network 10 but could be connected to a telephone line, an antenna, a gateway, or any other type of communications link. Disk drives 22 may include a variety of types of storage media such as, for example, floppy disk drives, hard disk drives, CD ROM drives, or magnetic tape drives. Although this embodiment employs a plurality of disk drives 36, a single disk drive 36 could be used without departing from the scope of the invention.

In accordance with the invention, delegation in a class-based language is achieved by employing two concepts of a message to "self". A message to "self" refers to a message directed to the same object that is currently processing another message. In other words, the self message results directly from the execution of a method in response to an earlier received message. The two concepts of self in accordance with the invention are as follows. The first is the self that is the current recipient of a message (the current target object). The second is the self that is the original recipient of a message which may delegate the message for execution (the primary target object).

To implement the dual concepts of self and achieve delegation in a class-based language, a message is sent with a self parameter (also known as a primary target parameter). Within a method, any messages to be sent to "self" (the object for which the method in question is being executed) are directed to the object specified in the incoming self parameter and the same parameter carries forward in the self parameter of the message being sent. If a message is intercepted by a message not found method (i.e. it is to be delegated), then that method leaves the self parameter unchanged but directs the message to the delegation object (the current target). If the message were further delegated, then the self parameter would still reference the original, primary target object. Consequently, any message from a delegation object to "self" would be directed to the original, primary target object.

Any message directed to another object is sent with the self parameter referencing that object. Operations on instance variables must always be performed by their accessor methods so that these operations will be delegated via the same mechanism as appropriate. When an instance variable is accessed directly, the current target self (the current object) is used to retrieve or set the value as is the normal operation.

Before describing an example of delegation in a class-based language, it may be useful to describe several applications of the invention. One application of the invention is in the implementation of "roles." In modeling real world concepts, it is frequently desirable to represent the concept of a "role." Examples of "role" are where a person may be in the role of an employee, a machine may be in the role of a resource on a project or an organization may be in the role of an owner of an asset. These roles are represented as associations of the principal entities. The employee is an association of the person and the employer; the resource is an association of the machine and the project; and the owner is an association of the organization and the asset. Each of these asociations may have state data for the association such as the date and time that the association was formed and other relationship information such as the employee's salary.

The difference between a role and other associations is that there is generally a desire for the role to inherit characteristics of one or both of the principal entities through delegation. For example, the employee is expected to have a name which is the name found in the associated person object. There may also be computational elements of a principal object that might be imputed to the role. The person might have travel preference computations which apply to any employment. These computations might use aspects of the person object, but there might also be situations where aspects of the employee role might override the corresponding aspects of the person. Delegation will support these representations.

Roles also illustrate how delegation in accordance with the invention may have a cascading capability. An employee object should delegate to a person object. The employee may in turn have a role as a manager and the manager object may delegate to the employee object. In turn, the manager might have a role as a member of a committee, and so on.

Delegation may also be useful in situations where the behavior of an object is dynamically determined or modified. Delegation may be used to implement adaptive behavior in an effective and flexible way. Essentially, delegation provides the opportunity to determine the behavior of an object through the "attachment" of other objects. In this manner, the functionality of an object can be dynamically configured and modified. A common situation is where an object has different states in which it should exhibit different behavior. Dynamic behavior can be implemented by attaching different delegation objects depending upon the state of the delegating object. For example, the modifications that can be made to an order for certain goods may depend upon the current status of the order. As the status of the order changes, different "change service" objects can be attached (through a reference in the order object) to provide different functionalities such that delegation will invoke different methods based upon state.

The invention may also be useful in the implementation of "views" in a class-based object-oriented language. A "view" is an abstraction for an object or object structure. A view may conceal some aspects of an object and present a flattened representation of multiple related objects. A view may also provide an interface that is not provided by the underlying object structure.

A "view," more generally, refers to an object that provides an interface to other objects. It presents an abstraction of a more complex object or object structure and provides a simplified representation or restricted representation that may serve to limit access for security purposes. A view has the ability to translate an interface, to provide an abstraction of a complex structure making it appear as a single object, restrict access to underlying objects, or to provide added functionality. Generally, messages to a view are forwarded to the primary object, i.e., delegated.

For example, a view of an employee object might provide access to name, address, etc. (such as in a company on-line telephone directory) but exclude access to compensation information. In some cases, the view may override some of the primary object's methods and may carry additional methods and instance variables that are of interest to the application in which the view is utilized but are not of a broader interest such that they would be incorporated in the primary object.

Delegation may also be useful when interfacing with an object sold by a third party software vendor. Often, a developer may desire to shorten development time by utilizing an existing object sold by a third party. The third party object may not have all of the desired functionality however. An application developer may also want to modify some methods of the existing object. Vendors, however, are reluctant to release the source code for an object that would allow such modifications. Instead, vendors normally sell objects in compiled form. The invention will allow a third party to protect its source code, yet still allow an application developer to incorporate the vendor's code while defining a specialized object to meet specific application requirements. The developer can create a front-end object with a link to the third party object. Messages will be routed through the front-end object in accordance with the invention so methods of the front-end object can take precedence over methods of the third party object.

Figure 3:
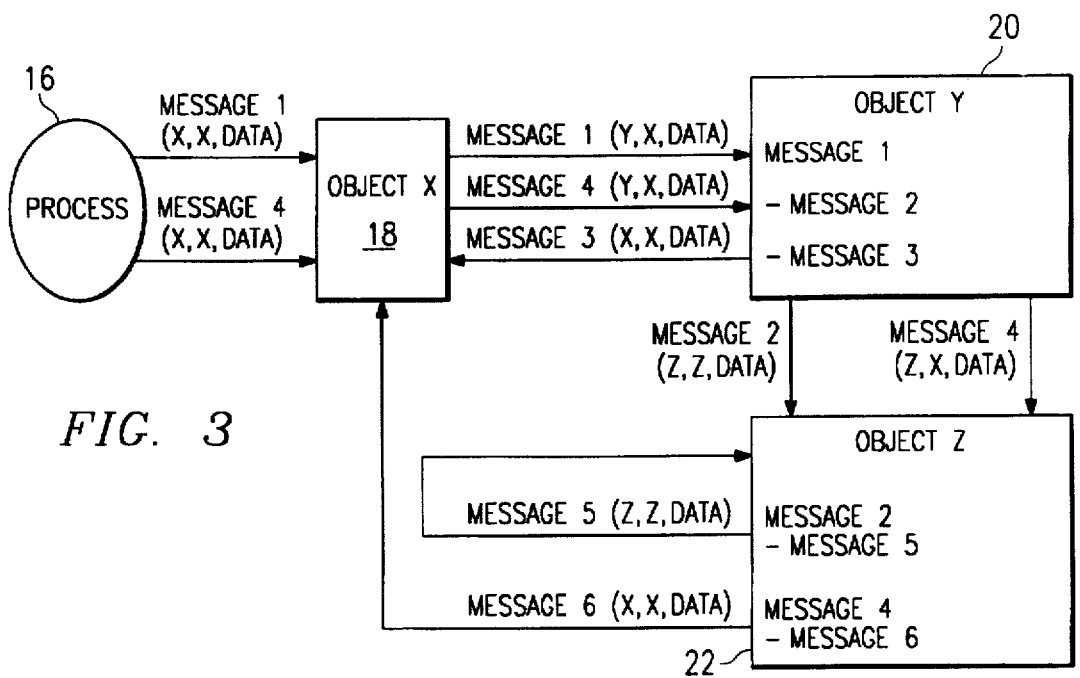
FIG. 3 illustrates an example that will be helpful in understanding the operation of the invention.

The operation of delegation in a class-based language in accordance with the invention can be more clearly understood by referring to FIG. 3. FIG. 3 illustrates an example of how delegation can be achieved in a class-based language. In this example, process 16 directs two messages, Message1 and Message4 to object X 18. The format of a message comprises the name of the message (message selector), along with the identity of the current target object, the primary target object parameter, and the data that will be used in processing the message. In this example, the identity of the current target object comprises the object to which the message is directed (the current target object) while the primary target parameter is the "self" parameter which identifies the primary target object. The "self" parameter identifies the object to which a message was first directed. This parameter allows the present invention to achieve delegation in a class-based language. The remaining parameters, "data," simply refers to data that will be used by the object that eventually processes the message.

In the example in FIG. 3, process 16 generates a first message, Message1, followed by a second message, Message4. To understand the operation of the invention, the processing of each of these messages will be described beginning with Message1.

Process 16 generates Message1 with the message directed at object X 18 (the current target object) and the self parameter set to object X 18 (the primary target object). When object X 18 receives Message1, it processes the message and determines that it does not have a method corresponding to Message1. Object X 18, however, has an association with object Y 20 and delegates Message1 to object Y 20. Delegation involves changing the object to which the message is directed (the current target object) to object Y 20 while leaving the "self" parameter unchanged. Thus, in this example, object X 18 delegates the message by generating Message1 (Y, X data). The "X" is the self parameter corresponding to the primary target object. Object Y 20 has a method corresponding to Message1 which in turn generates two additional messages, Message2 and Message3. Message2, a non-self message, is directed to object Z 22. Because Message2 is a non-self message originating with object Y 20, the self parameter for Message2 is set to object Z 22 because object Z 22 was the primary target object for Message2.

Message3, however, is a "self" message that would be directed to object Y 20 in the absence of the invention. In this embodiment, however, Message3, because it is a self message, is directed to the primary target object identified by the self parameter that was received by object Y 20 along with the message (in this case Message1) that caused the execution of a method that, in turn, generated Message3. Accordingly, Message3 is directed to object X 18 and the self parameter is set to object X 18 (is carried forward) because object X 18 was the original target object for which Message3, a self message, is being executed.

Message2 is a message recognized by object Z 22 and the method executed in response to Message2 generates another message, Message5, when the method is executed by object Z 22. Message5 is a self message which is directed to the primary target object identified by the "self" parameter that was received with Message2. Because object Z 22 was the primary target object identified in the self parameter, Message5 is directed back to object Z 22.

Thus, this example illustrates the basic operation of the invention. Within a method, any messages to be sent to "self" are directed to the primary target object specified in the incoming self parameter, illustrated by the direction of Message3 and Message5 in this example. When a message is delegated, the self identity specified in the self parameter is carried forward in the self parameter of the message being sent, in this example, illustrated by the delegation of Message1 from object X 18 to object Y 20. This aspect of the invention will also be illustrated by the delegation of Message4 from object X 18 to object Y 20 and from object Y 20 to object Z 22.

As further illustrated by this example, any "non-self" messages directed to other objects are sent with the self parameter referencing the current target object, in this example illustrated by the generation of Message2 and direction of Message2 to object Z 22 with the self parameter set to object Z 22.

Turning to the second message generated by process 16, Message4, the message is generated by process 16 and directed to object X 18 with the self parameter set to object X 18. Object X 18 does not have a method corresponding to Message4 and delegates Message4 to object Y 20 with the self parameter still set to object X 18 (the primary target object for Message4). Because object Y 20 does not have a method corresponding to Message4, but has an association with object Z 22, object Y 20 delegates Message4 to object Z 22. In accordance with the invention, however, the self parameter is still set to object X 18 (the primary target object for Message4) when object Y 20 directs Message4 to object Z 22. Object Z 22 has a method corresponding to Message4 so object Z 22 executes that method.

The method corresponding to Message4, however, generates an additional message, Message6. Message6 is a self message and would be directed to object Z 22 in the absence of the invention. Here, however, Message6 is directed to the object identified by the self parameter of Message4 (the primary target object for Message4)—the message that caused the generation of Message6. Thus, Message6 is directed by object Z 22 to object X 18. Object X 18 might, in turn, delegate Message6 to object Y 20, but object X 18 has the first opportunity to process Message6.

Figure 4:
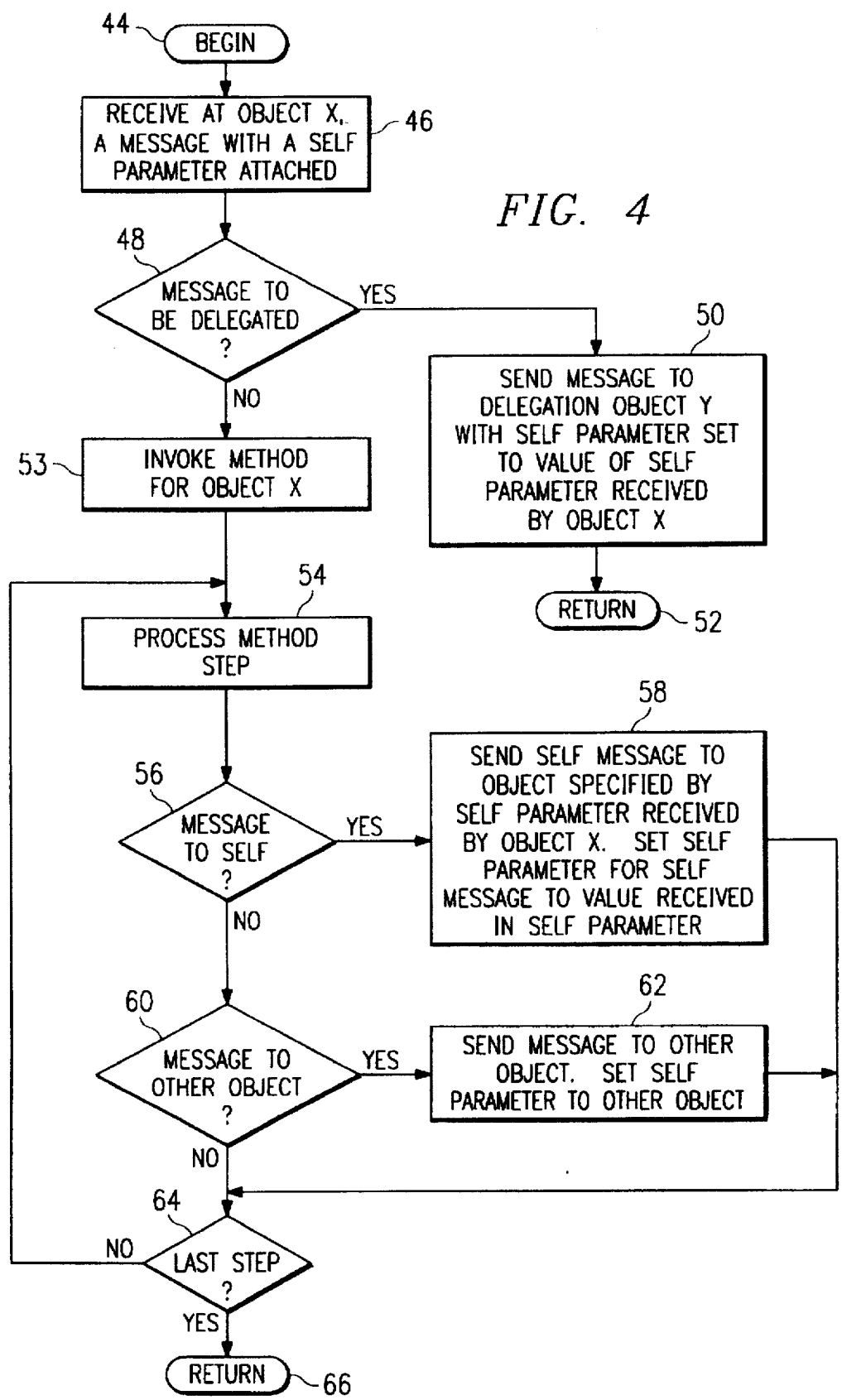
FIG. 4 illustrates a flow chart describing the operation of delegation in a class-based language in accordance with the invention.

The operation of the invention can be further understood by referring to FIG. 4. FIG. 4 illustrates a flow chart describing a process that may be used to achieve delegation in a class-based language in accordance with the invention. The process begins at step 44 with initialization. In step 46, a message is received at object X 18 wherein the message has a self parameter attached. In step 48, it is determined by object X 18 whether the message is to be delegated or not. If the message is to be delegated, then the process proceeds to step 50 where object X 18 sends the message to object Y 20 with the self parameter set to the value of the self parameter received by object X 18. The process then terminates in step 52. Generally, termination consists of returning to the original message sender after execution of the delegation is completed. If the message was not to be delegated in step 48, then a method corresponding to the method is invoked for object X 18 in step 53. Within the method, various steps are executed according to the method code. A step of the method corresponding to the message is processed in step 54.

In step 56, it is determined whether the method step is a message to self. If so, then in step 58, a message is sent to the object specified by the self parameter received by object X 18 along with the original message. The self parameter of the newly generated message is set to the value of the self parameter received with the original message. This value corresponds the primary target object. The procedure then continues in step 64 where it is determined whether the last step in the method has been reached. If so, then the method terminates in step 66, returning to the method sender. Otherwise, the next step is processed in step 54.

Returning to step 56, if the method step was not the generation of a self message, then in step 60, it is determined whether the method step is the generation of a message to another object (a non-self message). If not, then the procedure continues in step 64 as described above. If so, then in step 62 the message is sent to another object. The self parameter for this message is set to the same object as the target object because the message is neither being delegated nor constitutes a self message. The procedure then continues in step 64 as described above.

Note that references to instance variables in accordance with the invention should always be through accessor methods. By using accessor methods, a reference to an instance variable will be handled by the delegation mechanism of the invention just like any other method. This aspect of the invention allows instance variables on the primary target object to override instance variables of the same name on the delegation object.

Implementations of the invention might employ implicit or explicit delegation. In implicit delegation, an object would have a designated parent (i.e. delegation object) and any message that could not be handled by a target object would be automatically delegated to its designated parent, if any. Implicit delegation is appropriate for role objects. In explicit delegation, an object could invoke a method on any other object with the self parameter set to itself so that any message that the delegation object might intend to send to itself would be directed back to the originating object. This mechanism would be appropriate for view objects where the view might translate an incoming message by changing the selector or parameters as required by the underlying object being viewed. This mechanism also allows different messages to be delegated to different delegation objects.

Although the present invention has been described in detail, it should be understood that various changes, substitutions, and alterations can be made hereto without departing from the spirit and scope of the invention as defined by the appended claims.

What is claimed is:

1. A method for delegating messages with a computer between instances in a class based language, comprising:

receiving a first message at a first object, the first message containing a first target parameter;

delegating the first message to a second object, the delegated first message containing a second target parameter, wherein the value of the second target parameter equals the value of the first target parameter;

executing a first method of the second object in response to the delegated first message;

generating a first self message in response to executing the first method of the second object;

sending the first self message to the object identified in the second target parameter;

receiving a second message at the second object, the second message containing a third target parameter identifying the second object;

executing a second method of the second object in response to receiving the second message at the second object;

generating a second self message in response to executing the second method of the second object; and executing a third method of the second object in response to the second self message, the second object identified by the third target parameter.

2. The method of claim 1, wherein the first method generates a third message comprising a non-self message, the method further comprising:

sending the third message to a third object from the second object, the non-self message including a fourth target parameter comprising the identity of the third object.

3. The method of claim 2, further comprising:

delegating the third message by sending it from the third object to a fourth object, the delegated third message including a fifth target parameter comprising the identity of the third object.

4. The method of claim 1, wherein the first target parameter comprises the identity of the first object.

5. The method of claim 1, wherein the first object comprises a role object.

6. The method of claim 1, wherein the first object comprises a view of a fifth object.

7. The method of claim 1, wherein the second object comprises a compiled delegation object.

8. The method of claim 1, wherein the second object comprises a delegation object used to dynamically add functionality to an object.

9. A method for delegating messages with a computer between instances in a class based language, comprising:

delegating a first message to a first object, the first message including a first target parameter identifying a second object;

sending a first self message generated in response to the first message, from the first object to the second object identified by the first target parameter;

receiving a second message at the first object, the second message including a second target parameter identifying the first object;

generating a second self message in response to receiving the second message; and executing a first method at the first object in response to the second self message, the first object identified by the second target parameter.

10. The method of claim 9, further comprising:

sending a non-self message generated in response to the first message to a second object from the first object, the non-self message including a third target parameter comprising the identity of the second object.

11. The method of claim 10, further comprising:

delegating the non-self message by sending it to a third object from the second object, the delegated non-self message including a fourth target parameter comprising the identity of the second object.

12. A computer program utilizing a class based language for delegating messages between instances, comprising:

a computer-readable medium;

a computer program encoded on the computer-readable medium, the computer program comprising a plurality of objects including a first object, the computer program operable to:

delegate a first message to the first object, the first message including a first target parameter that identifies a second object;

send a first self message from the first object to the second object identified by the first target parameter;

receive a second message at the first object, the second message including a second target parameter that identifies the first object;

generate a second self message at the first object in response to the second message; and execute a first method at the first object in response to the second self message, the first object identified by the second target parameter.

13. The computer program of claim 12, wherein the computer program is further operable to send a non-self message to the second object from the first object, the non-self message including a third target parameter comprising the identity of the second object.

14. The computer program of claim 13, wherein the computer program is further operable to delegate the non-self message by sending it to a third object from the second object, the delegated non-self message including a fourth target parameter comprising the identity of the second object.

15. The computer program of claim 12, wherein the first object comprises a role object.

16. The computer program of claim 12, wherein the first object comprises a view of a fifth object.

* * * * *